United States Patent
Wang

(10) Patent No.: US 10,795,209 B2
(45) Date of Patent: Oct. 6, 2020

(54) LIQUID CRYSTAL PHASE SHIFTER, METHOD FOR PRODUCING THE SAME AND METHOD FOR SHIFTING PHASE OF ELECTROMAGNETIC WAVE

(71) Applicants: BOE TECHNOLOGY GROUP CO., LTD., Beijing (CN); Beijing BOE Special Display Technology Co., Ltd., Beijing (CN)

(72) Inventor: Jingming Wang, Beijing (CN)

(73) Assignees: BOE TECHNOLOGY GROUP CO., LTD., Beijing (CN); BEIJING BOE SPECIAL DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/169,100

(22) Filed: Oct. 24, 2018

(65) Prior Publication Data

US 2019/0294007 A1    Sep. 26, 2019

(30) Foreign Application Priority Data

Mar. 26, 2018    (CN) .......................... 2018 1 0252466

(51) Int. Cl.
*G02F 1/1337*    (2006.01)
*G02F 1/133*    (2006.01)
(Continued)

(52) U.S. Cl.
CPC ...... *G02F 1/133711* (2013.01); *G02F 1/1343* (2013.01); *G02F 1/13306* (2013.01); *G02F 1/31* (2013.01)

(58) Field of Classification Search
CPC ........... G02F 1/133711; G02F 1/13306; G02F 1/1343; G02F 1/31
See application file for complete search history.

(56) References Cited

U.S. PATENT DOCUMENTS 10,141,620 B2    11/2018    Jakoby et al.
10,629,973 B2    4/2020    Jakoby et al.
(Continued)

FOREIGN PATENT DOCUMENTS

CN    105308789 A    2/2016
CN    106374170 A    2/2017
(Continued)

OTHER PUBLICATIONS

First Chinese Office Action dated Jul. 3, 2020, received for corresponding Chinese Application No. 201810252466.9, 24 pages.

*Primary Examiner* — Nathanael R Briggs
(74) *Attorney, Agent, or Firm* — Kinney & Lange, P.A.

(57) ABSTRACT

A liquid crystal phase shifter, a method for producing the same and a method for shifting phase of electromagnetic wave are provided. The liquid crystal phase shifter includes: a first base substrate and a second base substrate opposed to each other; a first liquid crystal modulation portion and a second liquid crystal modulation portion between the first base substrate and the second base substrate; a first electromagnetic wave transport layer between the first base substrate and the first liquid crystal modulation portion; and a second electromagnetic wave transport layer between the first base substrate and the second liquid crystal modulation portion. The first liquid crystal modulation portion is configured to modulate a phase of electromagnetic waves in a first frequency range and the second liquid crystal modulation portion is configured to modulate a phase of electromagnetic waves in a second frequency range different from the first frequency range.

14 Claims, 3 Drawing Sheets

(51) Int. Cl.
    *G02F 1/1343*     (2006.01)
    *G02F 1/31*     (2006.01)

(56) References Cited

U.S. PATENT DOCUMENTS

| | | | |
|---|---|---|---|
| 2010/0231817 A1* | 9/2010 | Ide | G02F 1/13471 349/18 |
| 2010/0296152 A1* | 11/2010 | Shiraishi | G02F 1/0136 359/301 |
| 2015/0380789 A1 | 12/2015 | Jakoby et al. | |
| 2019/0103644 A1 | 4/2019 | Jakoby et al. | |
| 2020/0089042 A1 | 3/2020 | Cao et al. | |

FOREIGN PATENT DOCUMENTS

| | | |
|---|---|---|
| CN | 106684551 A | 5/2017 |
| CN | 107645049 A | 1/2018 |

* cited by examiner

LIQUID CRYSTAL PHASE SHIFTER, METHOD FOR PRODUCING THE SAME AND METHOD FOR SHIFTING PHASE OF ELECTROMAGNETIC WAVE

CROSS-REFERENCE TO RELATED APPLICATION

The present application claims the benefit of Chinese Patent Application No. 201810252466.9 filed on Mar. 26, 2018 in the State Intellectual Property Office of China, the whole disclosure of which is incorporated herein by reference.

TECHNICAL FIELD

The present disclosure relates to the photoelectric technical field, and in particular, to a liquid crystal phase shifter, a method for producing a liquid crystal phase shifter and a method for shifting a phase of an electromagnetic wave.

BACKGROUND

A phase shifter (also called as phaser) is a device for adjusting a phase of an electromagnetic wave, and has been applied widely in fields such as radar, missile attitude control, accelerators, communication and other instruments and apparatus.

A liquid crystal phase shifter is a phase shifter designed on the basic principle of a typical liquid crystal grating. By applying voltage to electrodes of the liquid crystal phase shifter, deflection directions of liquid crystal molecules of the liquid crystal phase shifter can be tuned to control refractivity of the liquid crystal molecules, such that the liquid crystal phase shifter can modulate the phase of the electromagnetic wave.

SUMMARY

An embodiment of the present disclosure provides a liquid crystal phase shifter, including: a first base substrate and a second base substrate opposed to each other; a first liquid crystal modulation portion and a second liquid crystal modulation portion between the first base substrate and the second base substrate; a first electromagnetic wave transport layer configured to transport an electromagnetic wave and arranged between the first base substrate and the first liquid crystal modulation portion; and a second electromagnetic wave transport layer configured to transport an electromagnetic wave and arranged between the first base substrate and the second liquid crystal modulation portion, wherein the first liquid crystal modulation portion is configured to modulate a phase of an electromagnetic wave in a first frequency range and the second liquid crystal modulation portion is configured to modulate a phase of an electromagnetic wave in a second frequency range different from the first frequency range.

In certain embodiments, the liquid crystal phase shifter further includes a separation wall between the first liquid crystal modulation portion and the second liquid crystal modulation portion.

In certain embodiments, the first electromagnetic wave transport layer is arranged at a surface of the first base substrate facing towards the first liquid crystal modulation portion.

In certain embodiments, the second electromagnetic wave transport layer is arranged at a surface of the first base substrate facing towards the second liquid crystal modulation portion.

In certain embodiments, the liquid crystal phase shifter further includes: a signal generator; and a signal switcher electrically connected to the signal generator, the signal switcher being configured to switch a transmission path of a signal from the signal generator, between a first signal path from the signal generator to the first liquid crystal modulation portion and a second signal path from the signal generator to the second liquid crystal modulation portion.

In certain embodiments, the signal switcher includes a switch and a controller for controlling the switch, and the liquid crystal phase shifter further includes a frequency range detector connected to the controller.

In certain embodiments, the first liquid crystal modulation portion includes: a first signal electrode on a side of the first liquid crystal modulation portion facing towards the first base substrate; a first grounding electrode on a side of the first liquid crystal modulation portion facing towards the second base substrate; a first alignment layer on a side of the first signal electrode away from the first base substrate; a second alignment layer on a side of the first grounding electrode away from the second base substrate; and a first liquid crystal layer between the first alignment layer and the second alignment layer.

In certain embodiments, the second liquid crystal modulation portion includes: a second signal electrode on a side of the second liquid crystal modulation portion facing towards the first base substrate; a second grounding electrode on a side of the second liquid crystal modulation portion facing towards the second base substrate; a third alignment layer on a side of the second signal electrode away from the first base substrate; a fourth alignment layer on a side of the second grounding electrode away from the second base substrate; and a second liquid crystal layer between the third alignment layer and the fourth alignment layer.

In certain embodiments, each of the first signal electrode and the second signal electrode is electrically connected to the signal switcher.

In certain embodiments, an orthographic projection of each of the first electromagnetic wave transport layer and the second electromagnetic wave transport layer on the first base substrate is separated from an orthographic projection of each of the first signal electrode and the second signal electrode on the first base substrate.

In certain embodiments, the first liquid crystal layer has a liquid crystal material different from liquid crystal material in the second liquid crystal layer.

In certain embodiments, each of the first electromagnetic wave transport layer and the second electromagnetic wave transport layer is electrically insulated from each of the first liquid crystal modulation portion and the second liquid crystal modulation portion, each of the first electromagnetic wave transport layer and the second electromagnetic wave transport layer including at least one transport portion In certain embodiments, the transport portion includes a wave guide layer or a microstrip line layer.

In certain embodiments, the liquid crystal phase shifter further includes a separation wall between the first liquid crystal layer and the second liquid crystal layer.

An embodiment of the present disclosure also provides a method for producing a liquid crystal phase shifter, the method including: providing a first base substrate and a second base substrate; forming a first electromagnetic wave transport layer and a second electromagnetic wave transport layer for transporting electromagnetic waves on a surface of the first base substrate; and forming a first liquid crystal modulation portion and a second liquid crystal modulation portion between the second base substrate and the first base substrate formed with the first electromagnetic wave transport layer and the second electromagnetic wave transport layer, the first liquid crystal modulation portion being formed on a side of the first electromagnetic wave transport layer away from the first base substrate, and the second liquid crystal modulation portion being formed on a side of the second electromagnetic wave transport layer away from the first base substrate, wherein the first liquid crystal modulation portion is configured to modulate a phase of an electromagnetic wave in a first frequency range and the second liquid crystal modulation portion is configured to modulate a phase of an electromagnetic wave in a second frequency range different from the first frequency range.

In certain embodiments, the first liquid crystal modulation portion includes a first signal electrode, a first grounding electrode, a first alignment layer, a second alignment layer and a first liquid crystal layer, and the second liquid crystal modulation portion includes a second signal electrode, a second grounding electrode, a third alignment layer, a fourth alignment layer and a second liquid crystal layer, the step of forming the first liquid crystal modulation portion and the second liquid crystal modulation portion between the second base substrate and the first base substrate formed with the first electromagnetic wave transport layer and the second electromagnetic wave transport layer including: forming the first signal electrode and the second signal electrode respectively on the surface of the first base substrate formed with the first electromagnetic wave transport layer and the second electromagnetic wave transport layer; forming the first alignment layer on a side of the first signal electrode away from the first base substrate and forming the third alignment layer on a side of the second signal electrode away from the first base substrate; forming the first grounding electrode and the second grounding electrode respectively on a surface of the second base substrate; forming the second alignment layer on a side of the first grounding electrode away from the second base substrate and forming the fourth alignment layer on a side of the second grounding electrode away from the second base substrate; forming the first liquid crystal layer between the first alignment layer and the second alignment layer, forming the second liquid crystal layer between the third alignment layer and the fourth alignment layer, and forming a separation wall between the first liquid crystal layer and the second liquid crystal layer for separating the first liquid crystal layer and the second liquid crystal layer from each other; and assembling the first base substrate with the second base substrate.

In certain embodiments, after forming the first electromagnetic wave transport layer and the second electromagnetic wave transport layer for transporting the electromagnetic waves on the surface of the first base substrate and before forming the first signal electrode and the second signal electrode respectively on the surface of the first base substrate formed with the first electromagnetic wave transport layer and the second electromagnetic wave transport layer, the method further includes: forming an insulating layer for covering the first electromagnetic wave transport layer and the second electromagnetic wave transport layer, on the surface of the first base substrate formed with the first electromagnetic wave transport layer and the second electromagnetic wave transport layer.

An embodiment of the present disclosure also provides a method for shifting a phase of electromagnetic waves by using a liquid crystal phase shifter, the liquid crystal phase shifter including: a first base substrate and a second base substrate opposed to each other; a first liquid crystal modulation portion and a second liquid crystal modulation portion between the first base substrate and the second base substrate; a first electromagnetic wave transport layer between the first base substrate and the first liquid crystal modulation portion; and a second electromagnetic wave transport layer between the first base substrate and the second liquid crystal modulation portion, wherein the first liquid crystal modulation portion is configured to modulate a phase of an electromagnetic wave in a first frequency range and the second liquid crystal modulation portion is configured to modulate a phase of an electromagnetic wave in a second frequency range different from the first frequency range, the method including: selecting a target liquid crystal modulation portion from the first liquid crystal modulation portion and the second liquid crystal modulation portion and selecting a target electromagnetic wave transport layer from the first electromagnetic wave transport layer and the second electromagnetic wave transport layer, depending on a predetermined frequency range of the electromagnetic waves, wherein an orthographic projection of the target liquid crystal modulation portion on the first base substrate being overlapped with an orthographic projection of the target electromagnetic wave transport layer on the first base substrate; controlling liquid crystal molecules in a liquid crystal layer in the target liquid crystal modulation portion to deflect depending on a target phase of the electromagnetic waves; and transporting the electromagnetic waves by using the target electromagnetic wave transport layer such that the liquid crystal molecules in the liquid crystal layer in the target liquid crystal modulation portion modulate a phase of the electromagnetic waves transported by the target electromagnetic wave transport layer.

In certain embodiments, the liquid crystal phase shifter further includes a signal generator and a signal switcher connected to the signal generator, the step of controlling the liquid crystal molecules in the liquid crystal layer in the target liquid crystal modulation portion to deflect depending on the target phase of the electromagnetic waves includes: switching a transmission path of a driving signal from the signal generator by the signal switcher to a signal path from the signal generator to the target liquid crystal modulation portion and transporting the driving signal to the target liquid crystal modulation portion; and applying a voltage to the liquid crystal layer of the target liquid crystal modulation portion by the driving signal to drive the liquid crystal molecules to deflect.

In certain embodiments, the step of selecting the target liquid crystal modulation portion from the first liquid crystal modulation portion and the second liquid crystal modulation portion and selecting the target electromagnetic wave transport layer from the first electromagnetic wave transport layer and the second electromagnetic wave transport layer, depending on the predetermined frequency range of the electromagnetic waves, includes: comparing the predetermined frequency range of the electromagnetic waves with the first frequency range and the second frequency range; selecting the first liquid crystal modulation portion as the target liquid crystal modulation portion and selecting the first electromagnetic wave transport layer as the target electromagnetic wave transport layer in response to the predetermined frequency range of the electromagnetic waves falling within the first frequency range; or selecting the second liquid crystal modulation portion as the target liquid crystal modulation portion and selecting the second electromagnetic wave transport layer as the target electromagnetic wave transport layer in response to the predetermined frequency range of the electromagnetic waves falling within the second frequency range.

BRIEF DESCRIPTION OF THE DRAWINGS

Drawings described herein are intended to provide further understanding of the present disclosure and constitute a part of the present disclosure. Exemplified embodiments of the present disclosure and explanations thereof are intended to explain the present disclosure, instead of constituting undue limitation on the present disclosure. In the drawings.

DETAILED DESCRIPTION OF EMBODIMENTS

Technical solutions in embodiments of the present disclosure will be described clearly and entirely below with reference to drawings in the embodiments of the present disclosure. Apparently, the described embodiments are only some of embodiments of the present disclosure, instead of all of embodiments. From the embodiments of the present disclosure, those skilled in the art may envisage other embodiments without any creative efforts. All of these other embodiments belong to the scope of the present disclosure.

Liquid crystal molecules have anisotropic characteristics. The liquid crystal molecules may be deflected by different voltages applied to the liquid crystal such that the liquid crystal phase shifter can modulate a phase of an electromagnetic wave. However, the inventor of the present application has recognized that in the related art, the liquid crystal phase shifter can typically modulate signal of the electromagnetic wave in only one frequency range, but cannot adjust the phase of the electromagnetic wave in two or more frequency ranges, and thus the liquid crystal phase shifter in the related art has a narrow application range.

Figure 1:
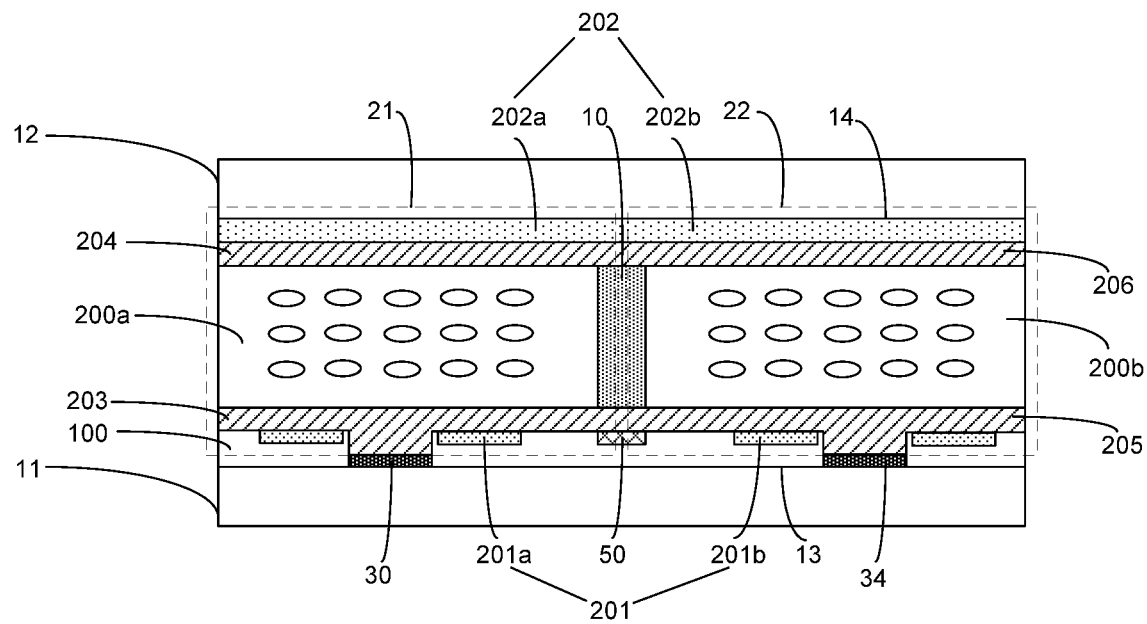
FIG. 1 is a schematic view showing a structure of a liquid crystal phase shifter in accordance with an embodiment of the present disclosure.

An embodiment of the present disclosure provides a liquid crystal phase shifter which can modulate the phase of the electromagnetic wave in two or more frequency ranges. As shown in FIG. 1, the liquid crystal phase shifter includes a first base substrate 11 and a second base substrate 12 opposed to each other. At least two independent liquid crystal modulation portions are provided between the first base substrate 11 and the second base substrate 12. In FIG. 1, a first liquid crystal modulation portion 21 and a second liquid crystal modulation portion 22 are shown. The liquid crystal phase shifter further includes a first electromagnetic wave transport layer 30 and a second electromagnetic wave transport layer 34 for transporting electromagnetic waves. The first electromagnetic wave transport layer 30 may be arranged between the first base substrate 11 and the first liquid crystal modulation portion 21 (for example, the first electromagnetic wave transport layer 30 may be arranged on a surface of the first base substrate 11 facing towards the first liquid crystal modulation portion 21 and contacts with the first liquid crystal modulation portion 21). The first liquid crystal modulation portion 21 is configured to modulate a phase of an electromagnetic wave in a first frequency range. The second liquid crystal modulation portion 22 is configured to modulate a phase of an electromagnetic wave in a second frequency range. The first frequency range and the second frequency range are different from each other. As an example, the first frequency range and the second frequency range are not overlapped with each other, or are overlapped partly with each other.

The above embodiment in which two liquid crystal modulation portions are provided has been described, however, the liquid crystal phase shifter according to the embodiment of the present disclosure may include more than two liquid crystal modulation portions. In these liquid crystal modulation portions, at least two liquid crystal modulation portions are configured to modulate different frequency ranges of electromagnetic wave, for example, each two ones of the liquid crystal modulation portions are configured to modulate different frequency ranges of electromagnetic wave. At least two liquid crystal modulation portions are provided and quantity of the liquid crystal modulation portions can be set as required.

The above liquid crystal phase shifter may modulate the phases of the electromagnetic wave in at least two frequency ranges.

As an example, the first electromagnetic wave transport layer 30 and the second electromagnetic wave transport layer 34 may be arranged in a same layer, that is, they are formed from the same material in the same patterning process (such as lithographic process).

Figure 4:
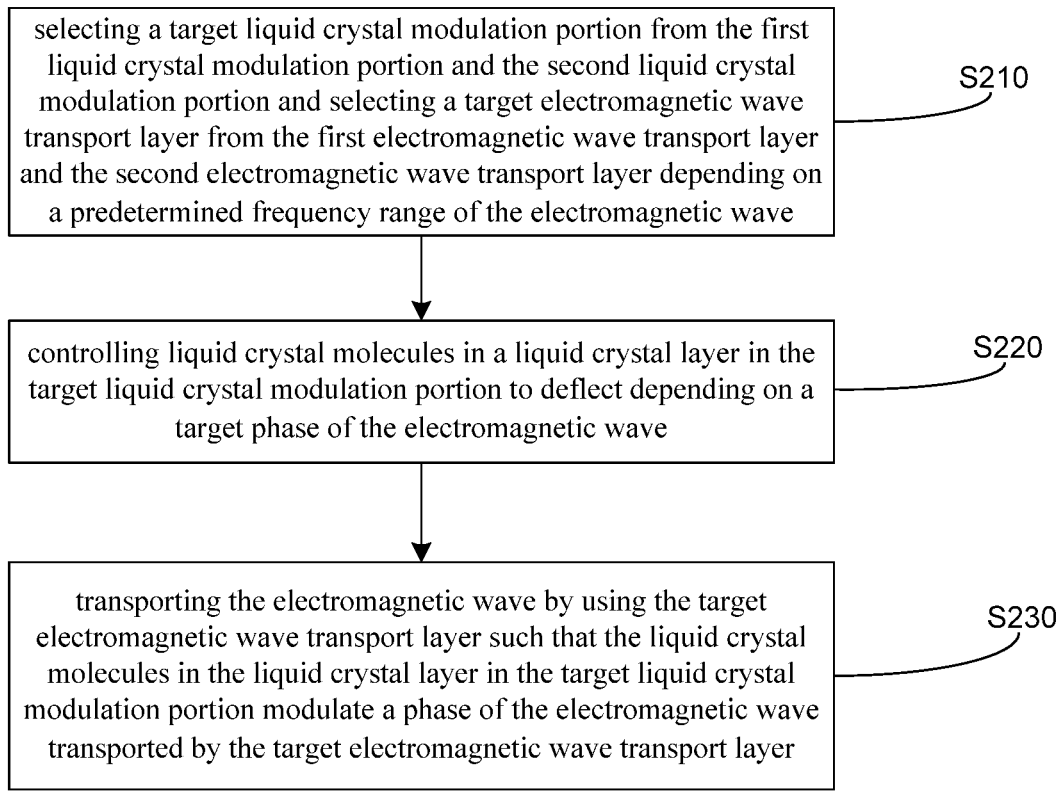
FIG. 4 is a flow chart of a method for shifting a phase of an electromagnetic wave in accordance with an embodiment of the present disclosure.

A process for shifting the phase of the electromagnetic wave by the liquid crystal phase shifter in accordance with an embodiment of the present disclosure will be described in detail with reference to FIG. 4.

Step S210: selecting a target liquid crystal modulation portion from at least two independent liquid crystal modulation portions (for example the first liquid crystal modulation portion 21 and the second liquid crystal modulation portion 22) and selecting a target electromagnetic wave transport layer corresponding to the target liquid crystal modulation portion (for example from the first electromagnetic wave transport layer and the second electromagnetic wave transport layer) depending on a predetermined frequency range of the electromagnetic wave. The target electromagnetic wave transport layer corresponding to the target liquid crystal modulation portion means that an orthographic projection of the target liquid crystal modulation portion on the first base substrate is overlapped with an orthographic projection of the target electromagnetic wave transport layer on the first base substrate.

Step S220: controlling liquid crystal molecules in a liquid crystal layer in the target liquid crystal modulation portion to deflect depending on a target phase of the electromagnetic wave.

Step S230: transporting the electromagnetic wave by using the target electromagnetic wave transport layer such that the liquid crystal molecules in the liquid crystal layer in the target liquid crystal modulation portion modulate a phase of the electromagnetic wave transported by the target electromagnetic wave transport layer.

From the above process, it can be recognized that in the liquid crystal phase shifter according to the embodiment of the present disclosure, the first liquid crystal modulation portion 21 and the second liquid crystal modulation portion 22 or more liquid crystal modulation portions that can work independently of each other for example are provided between the first base substrate 11 and the second base substrate 12. And each liquid crystal modulation portion can modulate the phase of the electromagnetic wave. All of the liquid crystal modulation portions may modulate different frequency ranges of electromagnetic wave. The first electromagnetic wave transport layer 30 and the second electromagnetic wave transport layer 34 for transporting the electromagnetic waves are provided on a surface 13 of the first base substrate 11 facing towards the first liquid crystal modulation portion 21 and the second liquid crystal modulation portion 22 (for example the surface of the first base substrate 11 in contact with the first liquid crystal modulation portion 21 and the second liquid crystal modulation portion 22). Thus, when the first electromagnetic wave transport layer 30 and the second electromagnetic wave transport layer 34 transport the electromagnetic wave, the liquid crystal phase shifter can modulate the phase of the electromagnetic wave in at least two frequency ranges, so as to enlarge the application range of the liquid crystal phase shifter.

It should be noted that the liquid crystal phase shifter according to the embodiment of the present disclosure may be used in an apparatus that needs to use a phase shifter such as radar or antennas.

In order to ensure separation between the first liquid crystal modulation portion 21 and the second liquid crystal modulation portion 22, as shown in FIG. 1, in an embodiment of the present disclosure, a separation wall 10 is provided between the first liquid crystal modulation portion 21 and the second liquid crystal modulation portion 22 adjacent to each other. The separation wall 10 is made from for example seal adhesives.

Figure 2:
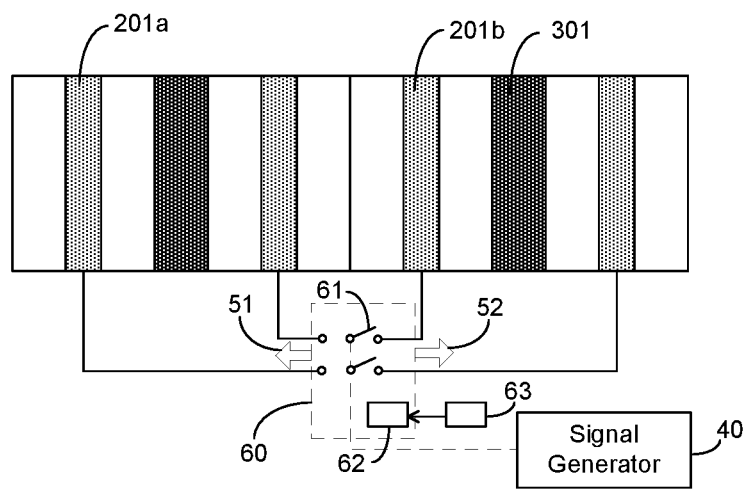
FIG. 2 is a schematic view showing a principle of switching frequency ranges by a liquid crystal phase shifter in accordance with an embodiment of the present disclosure.

It should be noted that, as shown in FIG. 2, in an embodiment of the present disclosure, the liquid crystal phase shifter may further include a signal generator 40 and a signal switcher 60 electrically connected to the signal generator 40. The signal switcher 60 may be electrically connected to all of the liquid crystal modulation portions (for example, the first liquid crystal modulation portion 21 and the second liquid crystal modulation portion 22, so as to use the signal switcher 60 to achieve electrical connections between the signal generator 40 and different liquid crystal modulation portions as required. It can ensure that a driving signal generated by the signal generator 40 may be transported by the signal switcher 60 to the target liquid crystal modulation portion, to control deflection of the liquid crystal molecules in the liquid crystal layer of the target liquid crystal modulation portion. In an example, the driving signal generated by the signal generator 40 has various forms, such as sinusoidal driving signal, square wave driving signal. The signal switcher 60 may be implemented as a multi-open and multi-control switch, a logic circuit or a single chip microprocessor based on program control.

As an example, the signal switcher 60 may be configured to switch a transmission path of a signal from the signal generator 40, between a first signal path 51 (indicated by a leftward arrow in FIG. 2) from the signal generator 40 to the first liquid crystal modulation portion 21 and a second signal path 52 (indicated by a rightward arrow in FIG. 2) from the signal generator 40 to the second liquid crystal modulation portion 22. It can drive the first liquid crystal modulation portion 21 and the second liquid crystal modulation portion 22 selectively and independently.

The signal switcher 60 may be a common multi-control switch, or the signal switcher 60 may include a switch 61 and a controller 62 configured to control the switch 61. As an example, the liquid crystal phase shifter may further include a frequency range detector 63 connected to the controller 62. In this way, the detected electromagnetic wave frequency range data may be transmitted to the controller such that the controller can control the switch 61 depending on the electromagnetic wave frequency range data and the driving signal can be transported to the liquid crystal modulation portion (the first liquid crystal modulation portion 21 or the second liquid crystal modulation portion 22) adapted to the electromagnetic wave frequency range.

As an example, when the target liquid crystal modulation portion and the target electromagnetic wave transport layer are selected depending on the predetermined frequency range of the electromagnetic wave, the predetermined frequency range of the electromagnetic wave may be compared with the first frequency range and the second frequency range. If the predetermined frequency range of the electromagnetic wave falls within the first frequency range, the first liquid crystal modulation portion is selected as the target liquid crystal modulation portion and the first electromagnetic wave transport layer is selected as the target electromagnetic wave transport layer; or if the predetermined frequency range of the electromagnetic wave falls within the second frequency range, the second liquid crystal modulation portion is selected as the target liquid crystal modulation portion and the second electromagnetic wave transport layer is selected as the target electromagnetic wave transport layer.

For example, when the quantity of the liquid crystal modulation portions is two (as shown in FIG. 1, they are the first liquid crystal modulation portion 21 and the second liquid crystal modulation portion 22), the signal switcher 60 may be a double-pole-double-throw switch, or a controller containing the double-pole-double-throw switch. When it needs the first liquid crystal modulation portion 21 to modulate the phase of the electromagnetic wave, the double-pole-double-throw switch can be configured to electrically connect the signal generator 40 with the first liquid crystal modulation portion 21. When it needs the second liquid crystal modulation portion 22 to modulate the phase of the electromagnetic wave, the double-pole-double-throw switch can be configured to electrically connect the signal generator 40 with the second liquid crystal modulation portion 22.

When the signal switcher 60 is a controller containing the double-pole-double-throw switch, the electromagnetic wave frequency range detector 63 may be provided to detect the frequency range of the electromagnetic wave. The controller controls the double-pole-double-throw switch to electrically connect the corresponding liquid crystal modulation portion and the signal generator 40 depending on the detected electromagnetic wave frequency range.

Optionally, as shown in FIG. 1, each liquid crystal modulation portion includes a signal electrode 201 and a grounding electrode 202. The signal electrode 201 included in each liquid crystal modulation portion is electrically connected to the signal switcher 60. In particular, the first liquid crystal modulation portion 21 may include a first signal electrode 201a and a first grounding electrode 202a. The first signal electrode 201a may be arranged on a side of the first liquid crystal modulation portion 21 facing towards the first base substrate 11. The first grounding electrode 202a may be arranged on a side of the first liquid crystal modulation portion 21 facing towards the second base substrate 12.

The signal electrodes 201 and the grounding electrodes 202 are made from transparent electrically conductive material, for example Indium Tin Oxide. The separation wall 10 may be made from seal adhesive containing electrically conductive particles. Each of the signal electrode 201 and the grounding electrode 202 included in each liquid crystal modulation portion may be electrically connected to other structures (for example traces) by the electrically conductive particles contained in the corresponding separation wall 10.

Further, as shown in FIG. 1 and FIG. 2, the first signal electrode 201a is arranged on a surface of the first base substrate 11 facing towards the first liquid crystal modulation portion 21. A first alignment layer 203 is formed on a surface of the first signal electrode 201a away from the first base substrate 11. The first grounding electrode 202a is arranged on a surface of the second base substrate 12 facing towards the first liquid crystal modulation portion 21. A second alignment layer 204 is formed on a surface of the first grounding electrode 202a away from the second base substrate 12. A first liquid crystal layer 200a is provided between the first alignment layer 203 and the second alignment layer 204. Similarly, the second signal electrode 201b is arranged on a surface of the first base substrate 11 facing towards the second liquid crystal modulation portion 22. A third alignment layer 205 is formed on a surface of the second signal electrode 201b away from the first base substrate 11. The second grounding electrode 202b is arranged on a surface of the second base substrate 12 facing towards the second liquid crystal modulation portion 22. A fourth alignment layer 206 is formed on a surface of the second grounding electrode 202b away from the second base substrate 12. A second liquid crystal layer 200b is provided between the third alignment layer 205 and the fourth alignment layer 206.

In an example, the first grounding electrode 202a included in the first liquid crystal modulation portion 21 may be integrated with the second grounding electrode 202b included in the second liquid crystal modulation portion 22. Alternatively, the first grounding electrode 202a and the second grounding electrode 202b may be formed separately. In consideration of convenience for producing the liquid crystal phase shifter, the grounding electrodes 202 in all of the liquid crystal modulation portions may be integrated. As such, the first alignment layer 203 included in the first liquid crystal modulation portion 21 may be integrated with the third alignment layer 205 included in the second liquid crystal modulation portion 22 (It is benefit for producing the liquid crystal phase shifter). Alternatively, the first alignment layer 203 and the third alignment layer 205 may be formed separately. The second alignment layer 204 included in the first liquid crystal modulation portion 21 may be integrated with the fourth alignment layer 206 included in the second liquid crystal modulation portion 22 (It is benefit for producing the liquid crystal phase shifter). Alternatively, the second alignment layer 204 and the fourth alignment layer 206 may be formed separately.

As shown in FIG. 1 and FIG. 2, the first signal electrode 201a included in the first liquid crystal modulation portion 21 may be connected to the signal switcher 60 by the following means: forming the signal switcher 60 and a common trace 50 connected to the signal switcher 60 on a surface of the first base substrate 11, orthographic projections of the signal switcher 60 and the common trace 50 on the first base substrate 11 being within an orthographic projection of the separation wall 10 on the first base substrate 11, the signal generator 40 being connected by the common trace 50 to the signal switcher 60, and the signal switcher 60 being connected to the first signal electrode 201a included in the first liquid crystal modulation portion 21 and the second signal electrode 201b included in the second liquid crystal modulation portion 22. In this way, it ensures that the signal switcher 60 and the common trace 50 cannot degrade transport of the electromagnetic wave.

It should be noted that each liquid crystal modulation portion can modulate the phase of the electromagnetic wave in a special frequency range just because the modulated electromagnetic wave frequency range is determined by the liquid crystal molecule characteristics of the liquid crystal layer contained in each liquid crystal modulation portion. The liquid crystal molecule characteristics may include parameters such as dielectric constant, response time, dielectric loss. The skilled person in the art can select suitable liquid crystal molecules to produce the liquid crystal layer included in the liquid crystal modulation portion depending on the frequency range of the electromagnetic wave modulated by each liquid crystal modulation portion. For example, in order to modulate the phase of the electromagnetic wave in different frequency ranges, the first liquid crystal layer 200a in the first liquid crystal modulation portion 21 may have liquid crystal material different from that in the second liquid crystal layer 200b in the second liquid crystal modulation portion 22.

For example, the liquid crystal phase shifter is used in microwave modulation. The liquid crystal molecules in the liquid crystal layers contained in the liquid crystal modulation portions should have functions of modulating phases of the electromagnetic wave in different microwave frequency ranges respectively. Such liquid crystal molecules may be called as microwave liquid crystal. Such microwave liquid crystal has property similar to the property of TN (Twisted Nematic) type liquid crystal molecules. The liquid crystal molecules can be driven to deflect by electrical signals.

It should be noted that in the liquid crystal phase shifter according to the embodiment of the present disclosure, the direction along which the electromagnetic wave enters the electromagnetic wave transport layer depends on an entrance of the electromagnetic wave transport layer. Generally, inorganic material may affect the electromagnetic wave to some extent and the base substrate is typically made from glass. Thus, in the embodiment of the present disclosure, the entrance of the electromagnetic wave transport layer is located at one side of the liquid crystal phase shifter and an exit of the electromagnetic wave transport layer is located at the other side of the liquid crystal phase shifter.

In particular, in an embodiment of the present disclosure, the electromagnetic wave transport layer includes at least two groups of transport portions in one to one correspondence with at least two liquid crystal modulation portions. As an example, as shown in FIG. 1 and FIG. 2, each of the first electromagnetic wave transport layer 30 and the second electromagnetic wave transport layer 34 may include at least one transport portion. When each of the first electromagnetic wave transport layer 30 and the second electromagnetic wave transport layer 34 includes a plurality of transport portions, the plurality of transport portions may be connected together or may be separated from each other. When all of the transport portions are connected together, an entrance of the first transport portion is used as an entrance of the electromagnetic wave and an exit of the last transport portion is used as an exit of the electromagnetic wave. When the plurality of transport portions are separated from each other, entrances of all transport portions are used as the entrance of the electromagnetic wave and exits of all transport portions are used as the exit of the electromagnetic wave that has entered the transport portions.

Different groups of transport portions corresponding to different liquid crystal modulation portions respectively may be connected to each other, or disconnected to each other. When all of groups of transport portions are connected to each other, only desired liquid crystal modulation portions can be controlled to transport the electromagnetic wave in adapted frequency range. That is, when all of groups of transport portions are connected, the liquid crystal phase shifter can only process the electromagnetic wave in one frequency range. When the groups of transport portions are separated from each other, the various liquid crystal modulation portions can be controlled simultaneously such that the liquid crystal phase shifter can process the electromagnetic wave in a plurality of frequency ranges together in the same period.

It should be noted that each group of transport portions (corresponding to one liquid crystal modulation portion) includes at least one transport portion. The transport portion is a waveguide layer, a microstrip line layer or the like. However, embodiments of the present disclosure are not limited to this. The specific type of the transport portions can be adjusted suitably depending on the frequency range of the transported electromagnetic wave.

For example, when each transport portion is the microstrip line, as shown in FIG. 1, an entrance of the microstrip line may be connected to an electromagnetic wave transport device such as coaxial-cables. The microstrip line may be made on the first base substrate 11 by coating process. The material of the microstrip line may be copper, or other electrically conductive material that can achieve the microstrip line function, as long as it has characteristics such as high electrical conductivity, good stability and strong adhesion to the first base substrate 11.

Further, as illustrated in FIG. 2, when two liquid crystal modulation portions, i.e., the first liquid crystal modulation portion 21 and the second liquid crystal modulation portion 22, are provided, the first liquid crystal modulation portion 21 includes the first signal electrode 201*a* composed of two strip electrodes. Each of the first electromagnetic wave transport layer 30 and the second electromagnetic wave transport layer 34 includes a group of transport portions. Each group of transport portions includes a microstrip line. In this case, the microstrip line included in the group of transport portions corresponding to the first signal electrode 201*a* is defined as a first microstrip line 301. The second liquid crystal modulation portion 22 includes the second signal electrode 201*b* composed of two strip electrodes. In this case, the microstrip line included in the group of transport portions corresponding to the second signal electrode 201*b* is defined as a second microstrip line 302.

Considering adverse effects of the electromagnetic field on the phase modulation of the electromagnetic wave, in order to prevent the signal electrodes from disturbing the electromagnetic wave transported in the electromagnetic wave transport layers, as shown in FIG. 1, each of the first electromagnetic wave transport layer 30 and the second electromagnetic wave transport layer 34 is electrically insulated from each of the first signal electrode 201*a* in the first liquid crystal modulation portion 21 and the second signal electrode 201*b* in the second liquid crystal modulation portion 22. In this way, the first signal electrode 201*a* in the first liquid crystal modulation portion 21 and the second signal electrode 201*b* in the second liquid crystal modulation portion 22 can be prevented from disturbing the electromagnetic wave transported in the first electromagnetic wave transport layer 30 and the second electromagnetic wave transport layer 34. In particular, an insulation layer 100 may be provided to electrically insulate the first electromagnetic wave transport layer 30 and the second electromagnetic wave transport layer 34 from the first signal electrode 201*a* and the second signal electrode 201*b*. The first electromagnetic wave transport layer 30 and the second electromagnetic wave transport layer 34 and the first signal electrode 201*a* and the second signal electrode 201*b* may be arranged in the same layer, or may not be arranged in the same layer. It may be selected depending on the specific process requirements.

In addition, as an example, the first signal electrode 201*a* and the second signal electrode 201*b* may be made from indium tin oxide which is an inorganic material. If the liquid crystal layers of the liquid crystal modulation portions modulate the phase of the electromagnetic wave, the first signal electrode 201*a* and the second signal electrode 201*b* may disturb the phase modulation of the electromagnetic wave. The first alignment layer 203 is typically made from such as polyimide without affecting the electromagnetic wave. Thus, an orthographic projection of the first electromagnetic wave transport layer 30 on the first base substrate 11 is separated from an orthographic projection of the first signal electrode 201*a* on the first base substrate 11, and an orthographic projection of the second electromagnetic wave transport layer 34 on the first base substrate 11 is separated from an orthographic projection of the second signal electrode 201*b* on the first base substrate 11.

For example, when each of the first signal electrode 201*a* and the second signal electrode 201*b* is composed of a plurality of strip electrodes and there is an electrode gap between two adjacent strip electrodes, each group of transport portions in the first electromagnetic wave transport layer 30 and the second electromagnetic wave transport layer 34 includes microstrip lines. In this case, an orthographic projection of each of the microstrip lines in each group of transport portions on the first base substrate 11 should be separated from an orthographic projection of each of the plurality of strip electrodes of the corresponding liquid crystal modulation portion on the first base substrate 11. In this way, the orthographic projection of each of the microstrip lines in each group of transport portions on the first base substrate 11 overlaps with an orthographic projection of the electrode gap in the corresponding liquid crystal modulation portion on the first base substrate 11, or the orthographic projection of each of the microstrip lines in each group of transport portions on the first base substrate 11 falls within the orthographic projection of the electrode gap in the corresponding liquid crystal modulation portion on the first base substrate 11. It can avoid influence of the signal electrodes 201 on the electromagnetic wave.

Figure 3:
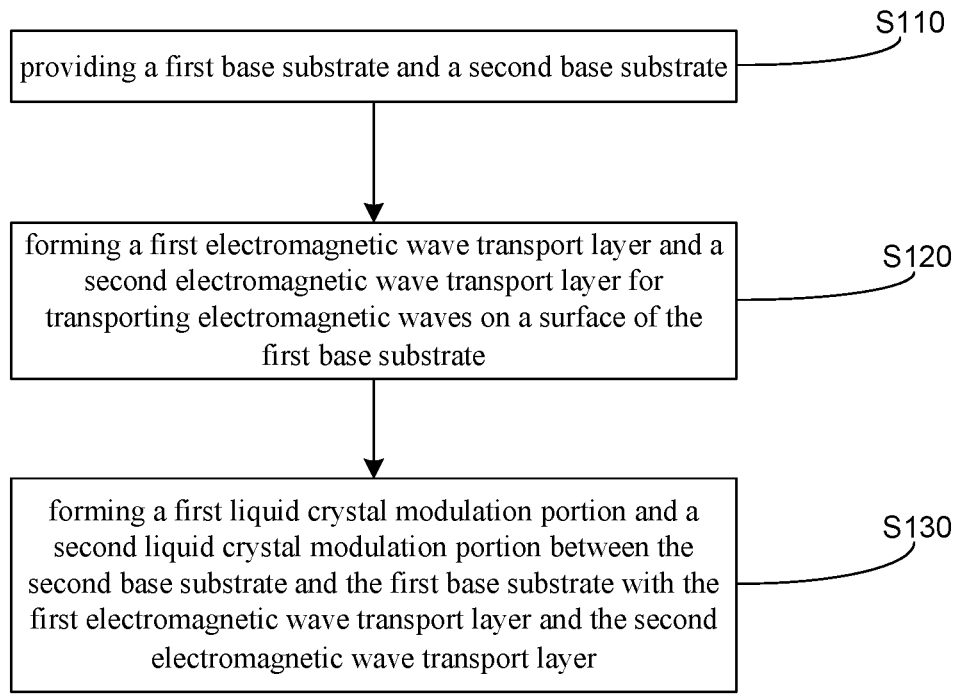
FIG. 3 is a flow chart of a method for producing a liquid crystal phase shifter in accordance with an embodiment of the present disclosure.

An embodiment of the present disclosure also provides a method for producing a liquid crystal phase shifter. As shown in FIG. 3, the method includes:

Step S110: providing a first base substrate 11 and a second base substrate 12;

Step S120: forming a first electromagnetic wave transport layer 30 and a second electromagnetic wave transport layer 34 for transporting electromagnetic waves on a surface of the first base substrate 11; and Step S130: forming a first liquid crystal modulation portion 21 and a second liquid crystal modulation portion 22 between the second base substrate 11 and the first base substrate 12 with the first electromagnetic wave transport layer 30 and the second electromagnetic wave transport layer 34.

Each of the first liquid crystal modulation portion 21 and the second liquid crystal modulation portion 22 is configured to modulate the phase of the electromagnetic wave. Different liquid crystal modulation portions are configured to modulate the electromagnetic waves in different frequency ranges respectively.

In comparison with the related art, the method for producing the liquid crystal phase shifter according to the embodiment of the present disclosure has the same beneficial effects as that of the liquid crystal phase shifter as described in the above embodiments. The details will be omitted herein.

As an example, as shown in FIG. 3, the above Step S130 includes:

forming a first signal electrode 201a and a second signal electrode 201b respectively on the surface of the first base substrate 11 with the first electromagnetic wave transport layer and the second electromagnetic wave transport layer;

forming a first alignment layer 203 on a side of the first signal electrode 201a away from the first base substrate 11 and forming a third alignment layer 205 on a side of the second signal electrode 201b away from the first base substrate 11, an orthographic projection of any one of the first electromagnetic wave transport layer 30 and the second electromagnetic wave transport layer 34 on the first base substrate 11 being separated from an orthographic projection of the signal electrode in each liquid crystal modulation portion on the first base substrate 11;

forming a first grounding electrode 202a and a second grounding electrode 202b respectively on a surface 14 of the second base substrate 12;

forming a second alignment layer 204 on a side of the first grounding electrode 202a away from the second base substrate 12 and forming a fourth alignment layer 206 on a side of the second grounding electrode 202b away from the second base substrate 12;

forming at least one separation wall 10 containing electrically conductive particles between the first alignment layer 203 and the second alignment layer 204 such that an orthographic projection of one separation wall 10 on the first base substrate 11 is between orthographic projections of two adjacent signal electrodes 201 on the first base substrate 11;

connecting at least two signal electrodes 201 to the signal switcher 60; forming a common trace 50 connected to the signal generator 40 on the first base substrate 11 (for example, when there are two signal electrodes 201, the first signal electrode 201a and the second signal electrode 201b, the common trace 50 may be disposed between the first signal electrode 201a and the second signal electrode 201b, and an orthographic projection of the common trace 50 on the first base substrate 11 is located within an orthographic projection of the separation wall 10 on the first base substrate 11);

assembling the first base substrate with the second base substrate together (for example, the first base substrate 11 and the second base substrate 12 are assembled and sealed by liquid crystal injection process and sealing process such that at least two independent liquid crystal modulation portions can be formed between the first base substrate 11 and the second base substrate 12. At least two signal electrodes 201 or the grounding electrodes 202 can be connected to other structures (such as traces) by the electrically conductive particles contained in the at least one separation wall 10).

As illustrated in FIG. 1, in an embodiment of the present disclosure, before forming the first alignment layer 203 and the third alignment layer 205 on the surfaces of the at least two signal electrodes 201 away from the first base substrate 11, the above Step S130 further includes:

forming an insulating layer 100 covering the first electromagnetic wave transport layer 30 and the second electromagnetic wave transport layer 34, on the surface of the first base substrate 11 with the first electromagnetic wave transport layer 30 and the second electromagnetic wave transport layer 34.

The insulating layer 100 may electrically insulate the first electromagnetic wave transport layer 30 and the second electromagnetic wave transport layer 34 from the first signal electrode 201a and the second signal electrode 201b.

Figure 5:
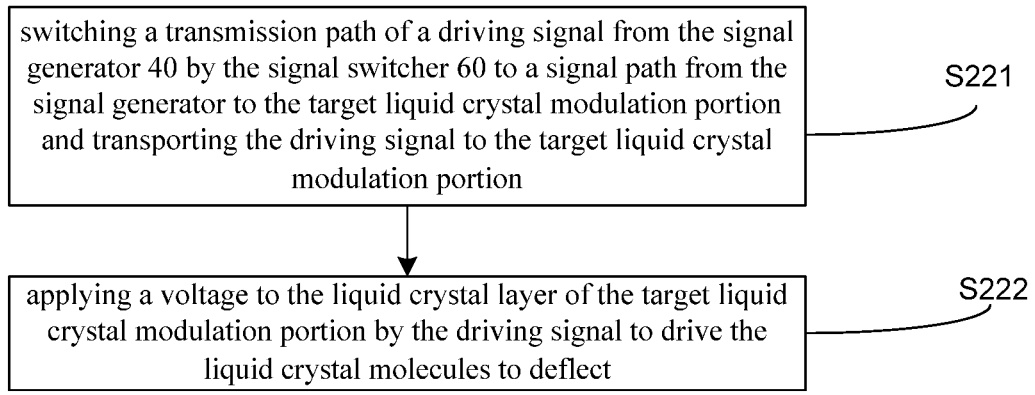
FIG. 5 is a flow chart of controlling deflection of liquid crystal molecules of a target liquid crystal modulation portion in accordance with an embodiment of the present disclosure.

An embodiment of the present disclosure also provides a method for shifting a phase of an electromagnetic wave by using the liquid crystal phase shifter as described in the above embodiments. As shown in FIG. 5, the method includes:

Step S210: selecting a target liquid crystal modulation portion from the first liquid crystal modulation portion and the second liquid crystal modulation portion and selecting a target electromagnetic wave transport layer from the first electromagnetic wave transport layer and the second electromagnetic wave transport layer depending on a predetermined frequency range of the electromagnetic wave, an orthographic projection of the target liquid crystal modulation portion on the first base substrate being overlapped with an orthographic projection of the target electromagnetic wave transport layer on the first base substrate;

Step S220: controlling liquid crystal molecules in a liquid crystal layer in the target liquid crystal modulation portion to deflect depending on a target phase of the electromagnetic wave;

Step S230: transporting the electromagnetic wave by using the target electromagnetic wave transport layer such that the liquid crystal molecules in the liquid crystal layer in the target liquid crystal modulation portion modulate a phase of the electromagnetic wave transported by the target electromagnetic wave transport layer.

In comparison with the related art, the method for shifting the phase of the electromagnetic wave according to the embodiment of the present disclosure has the same beneficial effects as that of the liquid crystal phase shifter as described in the above embodiments. The details will be omitted herein.

In particular, when the liquid crystal phase shifter as described in the above embodiments further includes a signal switcher 60 connected to the signal generator 40, as shown in FIG. 1 and FIG. 5, the Step S220 includes:

Step S221: switching a transmission path of a driving signal from the signal generator 40 by the signal switcher 60 to a signal path from the signal generator to the target liquid crystal modulation portion and transporting the driving signal to the target liquid crystal modulation portion; and Step S222: applying a voltage to the liquid crystal layer of the target liquid crystal modulation portion by the driving signal to drive the liquid crystal molecules to deflect.

Optionally, in an embodiment of the present disclosure, the transporting the electromagnetic wave to the target liquid crystal modulation portion includes: transporting the electromagnetic wave to the target liquid crystal modulation portion through the first base substrate 11; or transporting the electromagnetic wave to the target liquid crystal modulation portion through the second base substrate 12.

Figure 6:
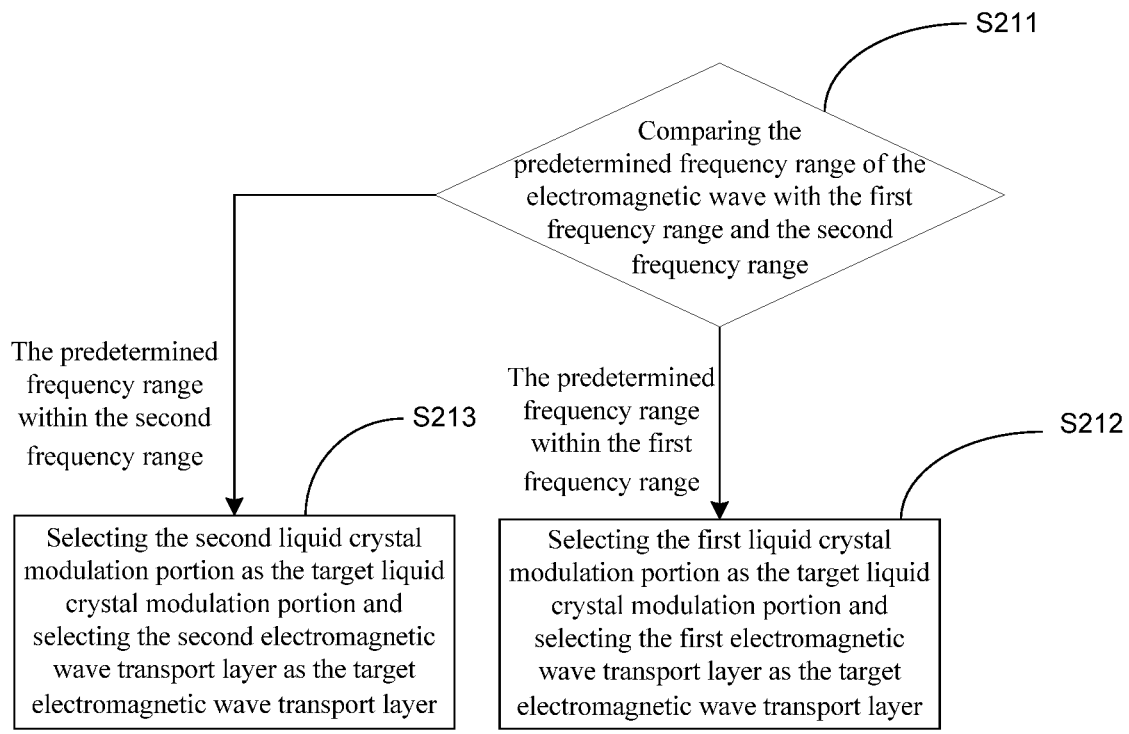
FIG. 6 is a flow chart showing a specific example of step S220 shown in FIG. 4.

As an example, as shown in FIG. 6, the Step S210 may include:

Step S211: comparing the predetermined frequency range of the electromagnetic wave with the first frequency range and the second frequency range;

Step S212: selecting the first liquid crystal modulation portion as the target liquid crystal modulation portion and selecting the first electromagnetic wave transport layer as the target electromagnetic wave transport layer in response to the predetermined frequency range of the electromagnetic wave falling within the first frequency range; or Step S213: selecting the second liquid crystal modulation portion as the target liquid crystal modulation portion and selecting the second electromagnetic wave transport layer as the target electromagnetic wave transport layer in response to the predetermined frequency range of the electromagnetic wave falling within the second frequency range.

As an example, the above Step S230 may include:

directing the electromagnetic wave transported in the electromagnetic wave transport layer to the liquid crystal molecules in the target liquid crystal modulation portion; and modulating the phase of the electromagnetic wave by the liquid crystal molecules in the target liquid crystal modulation portion in response to the driving signal.

In the description of the above embodiments, the specific features, structures, materials or characteristics can be combined in one or more embodiments or examples.

The exemplified embodiments of the present disclosure have been described. However, the protection scope of the present disclosure is not limited to this. Any modifications or alternations that can be envisaged by the skilled person in the art within the technical scope of the present disclosure should fall within the protection scope of the present disclosure. Therefore, the protection scope of the present disclosure should be defined by the appended claims and equivalents thereof.

What is claimed is:

1. A liquid crystal phase shifter, comprising:
a first base substrate and a second base substrate opposed to each other;
a first liquid crystal modulation portion and a second liquid crystal modulation portion between the first base substrate and the second base substrate;
a first electromagnetic wave transport layer configured to transport electromagnetic waves and arranged between the first base substrate and the first liquid crystal modulation portion; and
a second electromagnetic wave transport layer configured to transport electromagnetic waves and arranged between the first base substrate and the second liquid crystal modulation portion,
wherein the first liquid crystal modulation portion is configured to modulate a phase of electromagnetic waves in a first frequency range and the second liquid crystal modulation portion is configured to modulate a phase of electromagnetic waves in a second frequency range different from the first frequency range,
wherein the first liquid crystal modulation portion comprises:
a first signal electrode on a first side of the first liquid crystal modulation portion facing towards the first base substrate;
a first grounding electrode on a second side of the first liquid crystal modulation portion facing towards the second base substrate;
a first alignment layer on a side of the first signal electrode away from the first base substrate;
a second alignment layer on a side of the first grounding electrode away from the second base substrate; and
a first liquid crystal layer between the first alignment layer and the second alignment layer, and
wherein each of the first electromagnetic wave transport layer and the second electromagnetic wave transport layer is electrically insulated from each of the first liquid crystal modulation portion and the second liquid crystal modulation portion, each of the first electromagnetic wave transport layer and the second electromagnetic wave transport layer comprising at least one transport portion, the transport portion comprising a wave guide layer or a microstrip line layer made of copper.

2. The liquid crystal phase shifter of claim 1, further comprising a separation wall between the first liquid crystal modulation portion and the second liquid crystal modulation portion.

3. The liquid crystal phase shifter of claim 1, wherein the first electromagnetic wave transport layer is arranged at a surface of the first base substrate facing towards the first liquid crystal modulation portion.

4. The liquid crystal phase shifter of claim 1, wherein the second electromagnetic wave transport layer is arranged at a surface of the first base substrate facing towards the second liquid crystal modulation portion.

5. The liquid crystal phase shifter of claim 1, further comprising:
a signal generator; and
a signal switcher electrically connected to the signal generator, the signal switcher being configured to switch a transmission path of a signal from the signal generator, between a first signal path from the signal generator to the first liquid crystal modulation portion and a second signal path from the signal generator to the second liquid crystal modulation portion.

6. The liquid crystal phase shifter of claim 5, wherein the signal switcher comprises a switch and a controller for controlling the switch, and the liquid crystal phase shifter further comprises a frequency range detector connected to the controller.

7. The liquid crystal phase shifter of claim 1, wherein the second liquid crystal modulation portion comprises:
a second signal electrode on a first side of the second liquid crystal modulation portion facing towards the first base substrate;
a second grounding electrode on a second side of the second liquid crystal modulation portion facing towards the second base substrate;
a third alignment layer on a side of the second signal electrode away from the first base substrate;
a fourth alignment layer on a side of the second grounding electrode away from the second base substrate; and
a second liquid crystal layer between the third alignment layer and the fourth alignment layer.

8. The liquid crystal phase shifter of claim 7, wherein each of the first signal electrode and the second signal electrode is electrically connected to the signal switcher.

9. The liquid crystal phase shifter of claim 7, wherein an orthographic projection of each of the first electromagnetic wave transport layer and the second electromagnetic wave transport layer on the first base substrate is separated from an orthographic projection of each of the first signal electrode and the second signal electrode on the first base substrate.

10. The liquid crystal phase shifter of claim 1, wherein the first liquid crystal layer has a liquid crystal material different from liquid crystal material in the second liquid crystal layer.

11. The liquid crystal phase shifter of claim 7, further comprising a separation wall between the first liquid crystal layer and the second liquid crystal layer.

12. A method for producing the liquid crystal phase shifter according to claim 1, the method comprising:
providing the first base substrate and the second base substrate;
forming the first electromagnetic wave transport layer and the second electromagnetic wave transport layer for transporting electromagnetic waves on a surface of the first base substrate; and
forming the first liquid crystal modulation portion and the second liquid crystal modulation portion between the second base substrate and the first base substrate formed with the first electromagnetic wave transport layer and the second electromagnetic wave transport layer, the first liquid crystal modulation portion being formed on a side of the first electromagnetic wave transport layer away from the first base substrate, and the second liquid crystal modulation portion being formed on a side of the second electromagnetic wave transport layer away from the first base substrate,
wherein the first liquid crystal modulation portion is configured to modulate the phase of electromagnetic waves in the first frequency range and the second liquid crystal modulation portion is configured to modulate the phase of electromagnetic waves in the second frequency range different from the first frequency range.

13. The method of claim 12, wherein:
the second liquid crystal modulation portion comprises a second signal electrode, a second grounding electrode, a third alignment layer, a fourth alignment layer and a second liquid crystal layer, and
the step of forming the first liquid crystal modulation portion and the second liquid crystal modulation portion between the second base substrate and the first base substrate formed with the first electromagnetic wave transport layer and the second electromagnetic wave transport layer comprises:
forming the first signal electrode and the second signal electrode respectively on the surface of the first base substrate formed with the first electromagnetic wave transport layer and the second electromagnetic wave transport layer;
forming the first alignment layer on the side of the first signal electrode away from the first base substrate and forming the third alignment layer on a side of the second signal electrode away from the first base substrate;
forming the first grounding electrode and the second grounding electrode respectively on a surface of the second base substrate;
forming the second alignment layer on the side of the first grounding electrode away from the second base substrate and forming the fourth alignment layer on a side of the second grounding electrode away from the second base substrate;
forming the first liquid crystal layer between the first alignment layer and the second alignment layer, forming the second liquid crystal layer between the third alignment layer and the fourth alignment layer, and forming a separation wall between the first liquid crystal layer and the second liquid crystal layer for separating the first liquid crystal layer and the second liquid crystal layer from each other; and
assembling the first base substrate with the second base substrate.

14. The method of claim 13, wherein after forming the first electromagnetic wave transport layer and the second electromagnetic wave transport layer for transporting the electromagnetic waves on the surface of the first base substrate and before forming the first signal electrode and the second signal electrode respectively on the surface of the first base substrate formed with the first electromagnetic wave transport layer and the second electromagnetic wave transport layer, the method further comprises:
forming an insulating layer for covering the first electromagnetic wave transport layer and the second electromagnetic wave transport layer, on the surface of the first base substrate formed with the first electromagnetic wave transport layer and the second electromagnetic wave transport layer.

* * * * *